Patented June 6, 1933

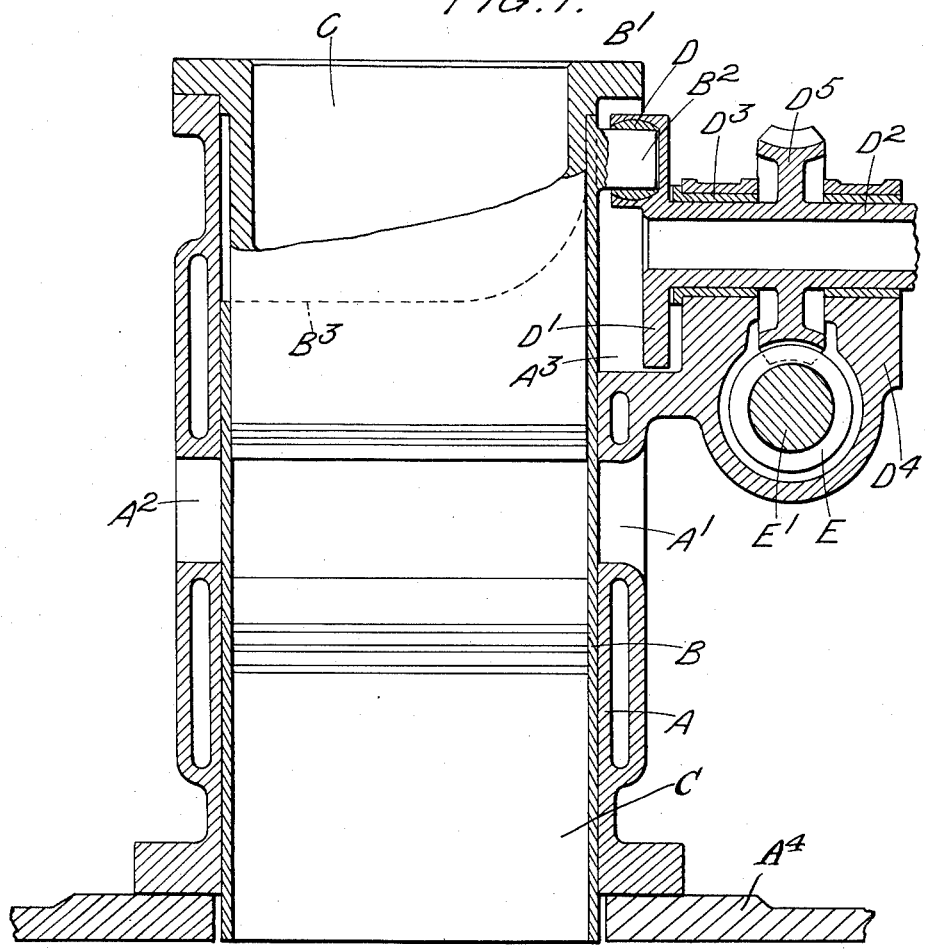

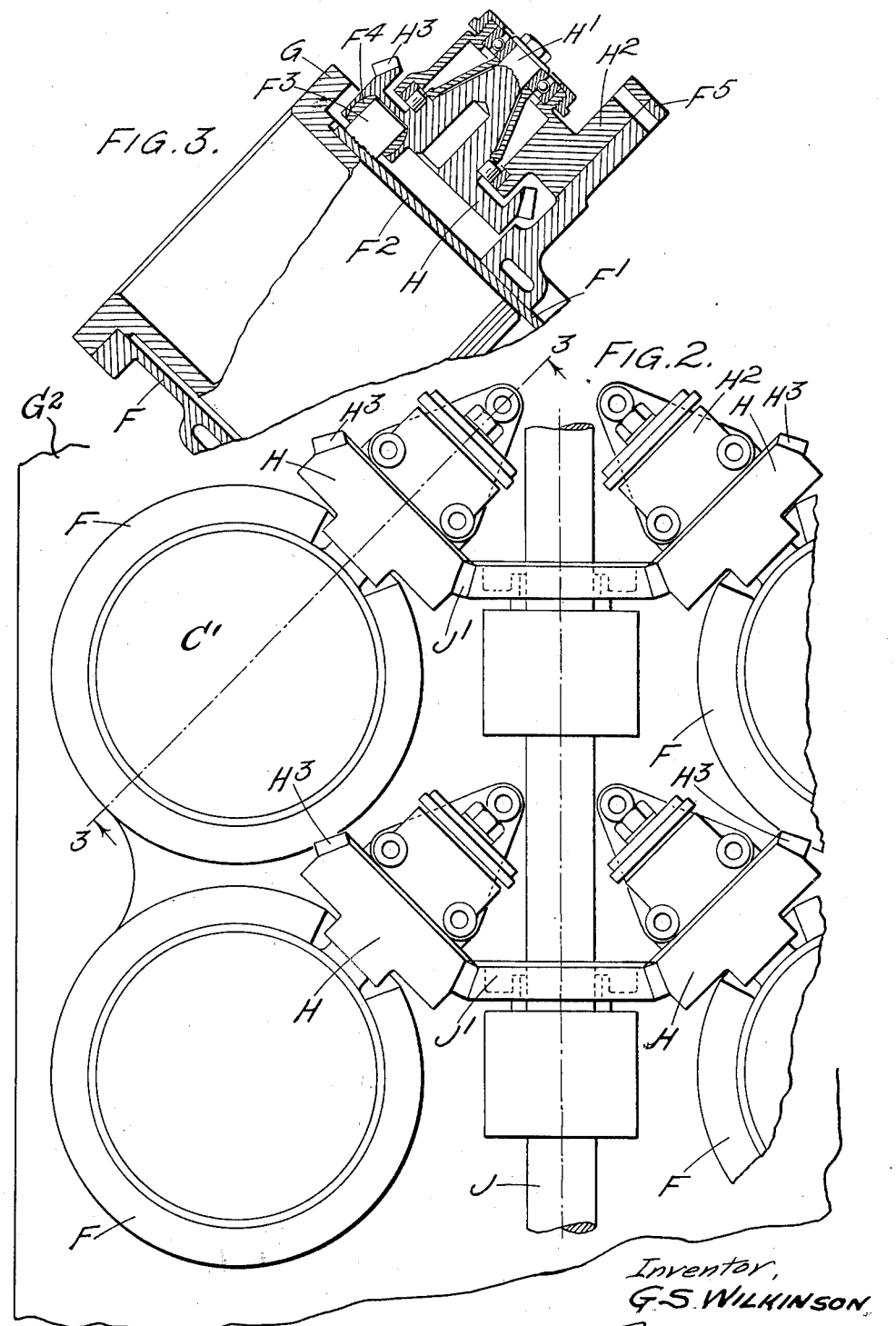

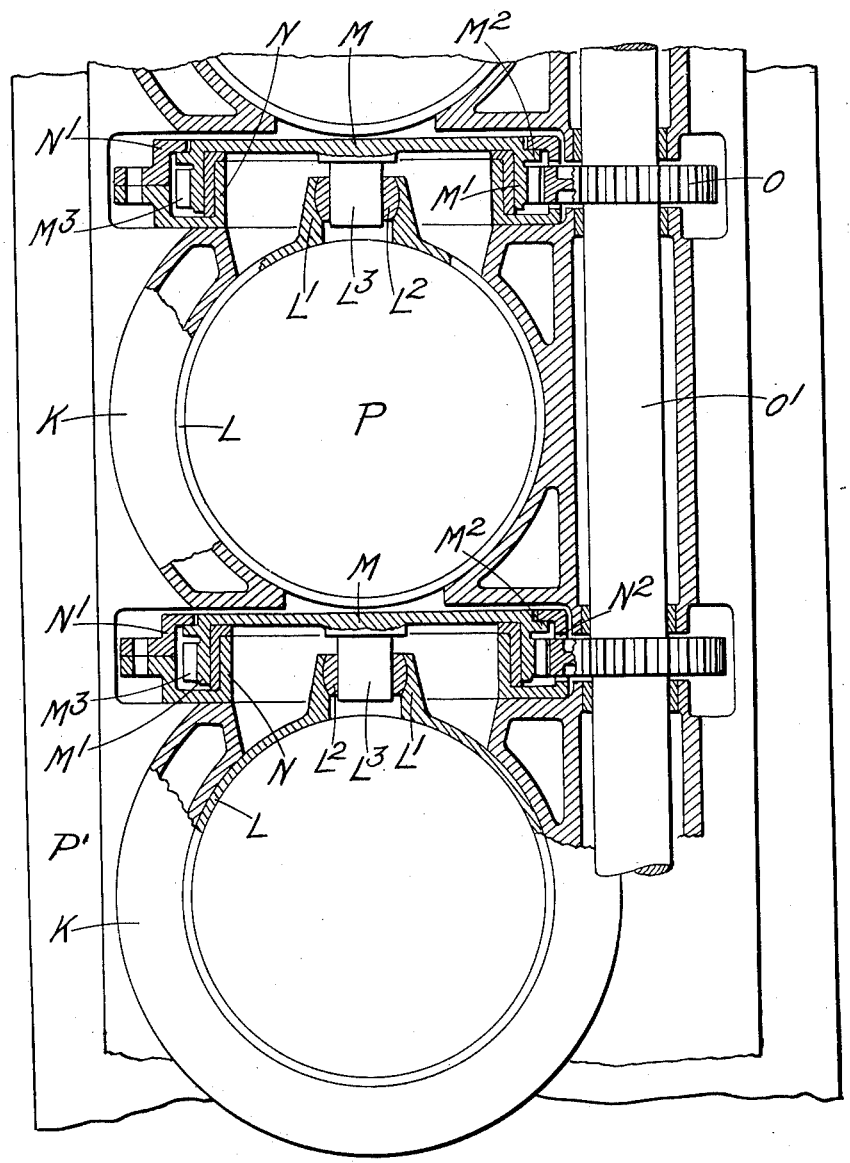

1,913,224

UNITED STATES PATENT OFFICE

GEORGE SHAKESPEARE WILKINSON, OF LONDON, ENGLAND, ASSIGNOR TO D. NAPIER & SON LIMITED, OF LONDON, ENGLAND, A COMPANY OF GREAT BRITAIN

RECIPROCATING FLUID PRESSURE ENGINE, PUMP, OR COMPRESSOR

Application filed December 28, 1931, Serial No. 583,568, and in Great Britain January 7, 1931.

This invention relates to reciprocating fluid pressure engines, pumps or compressors of the kind in which the flow of fluid through ports in the cylinder wall is controlled by a sleeve valve interposed between and in contact with both the cylinder wall and the piston which reciprocates within the sleeve, this sleeve being connected to operating mechanism by a driving member having such movement that a combined oscillating and reciprocating motion is imparted thereby to the sleeve.

In such engines as previously proposed, the driving member acted on the sleeve at a point within the crank case and in such constructions if the sleeve is to be inspected the cylinder has first to be removed, and the object of the present invention is to provide an improved form of engine of the above kind in which a driving member imparts a combined oscillating and reciprocating motion to the sleeve wherein removal of the sleeve for inspection or repair will be simplified.

To this end in a reciprocating fluid pressure engine, pump or compressor of the kind referred to according to the present invention, the driving member acts on a part of the sleeve lying outside the crank case and the arrangement is such that this driving member can be disconnected from the sleeve or from its actuating mechanism without access to the interior of the crank case and when so disconnected will permit the sleeve to be withdrawn from the outer end of the cylinder, i. e. that remote from the crank case. Conveniently the valve-operating mechanism is disposed wholly outside the crank case and a part carried either by the sleeve or the driving member extends between these members through an opening in the wall of the cylinder and serves to impart the movement to the sleeve.

In sleeve valve engines of the type in question, it is known to operate each sleeve from a rotary sleeve-operating shaft or like member arranged with its axis at right angles to the cylinder axis, this shaft being connected to the sleeve at a point eccentric with respect to the axis of rotation of the shaft through a pin or the like and a ball and socket or like flexible connection so that as the shaft rotates the desired combined oscillating and reciprocating motion is imparted to the sleeve. Thus, the sleeve may carry a radial pin which engages a ball and socket or like flexible joint eccentrically arranged on the operating shaft or the operating shaft may carry a short crank pin which engages a ball and socket joint or like flexible coupling member carried by the sleeve. When sleeve-operating mechanism of the above kind is employed in an engine according to the present invention, the arrangement may be such that when the sleeve is to be removed from the cylinder, the sleeve-operating shaft can be moved in the direction of its length away from the sleeve so as to cause disengagement between the pin and the ball and socket or like flexible joint, whereupon the sleeve can be withdrawn from the outer end of the cylinder. Alternatively the slot or aperture in the cylinder through which the pin or like connection between the sleeve and its operating mechanism passes, may extend to and through the outer end or edge of the cylinder so that, after the operating shaft has been freed from its bearings or these bearings have been disconnected from the cylinder casting, the pin or like connection can slide along this slot as the sleeve is withdrawn.

The invention may be carried into practice in various ways but three alternative constructions according to this invention are illustrated somewhat diagrammatically by way of example in the accompanying drawings, in which Figure 1 is a sectional elevation of an internal combustion engine cylinder with one form of sleeve-operating mechanism arranged according to this invention, Figure 2 is a plan of part of an alternative arrangement of sleeve-operating mechanism arranged according to this invention, Figure 3 is a section on the line 3—3 of Figure 2, and Figure 4 is a sectional plan of a still further form of sleeve-operating mechanism arranged according to this invention.

In the construction illustrated in Figure 1, the cylinder A has arranged within it a sleeve valve B the upper end of which is closed by a plug-like cylinder head C in known manner. A piston $C^1$ is arranged to reciprocate within the sleeve B which is adapted to have a combined oscillating and reciprocating motion imparted to its so as to control ports $A^1$, $A^2$ in the cylinder wall, and to this end is provided at its outer end $B^1$ with a pin $B^2$ which engages the interior of a ball member D freely mounted to rock in a part-spherical socket in a disc or crank web $D^1$ formed on the end of a rotatable shaft $D^2$ and constituting the driving member for the sleeve. If desired the outer end of the sleeve B may be cut away where it does not carry the pin $B^2$ as indicated at $B^3$ so as to lighten it. The shaft $D^2$ is mounted in bearings $D^3$ in a casing or support $D^4$ rigidly connected to or formed integral with the cylinder A, these bearings being of the split type so as to permit of removal of the shaft therefrom after the detachable bearing halves have been removed. A worm wheel $D^5$ is mounted on or formed integral with the shaft $D^2$ and rotation is imparted to this worm wheel by a worm E on a shaft $E^1$.

The cylinder A is slotted at $A^3$ in order to accommodate the disc $D^1$ and pin $B^2$ and to permit the movement of these parts, and it will be seen that the arrangement is such that, when the plug-like cylinder head C has been detached and removed from the cylinder and the upper halves of the two-part bearings $E^1$ have been removed, the sleeve valve can be withdrawn from the outer end of the cylinder without disturbing the connection between the cylinder and the crank case indicated at $A^4$.

The alternative construction shown in Figures 2 and 3 is shown as applied to an engine of the type having two rows of cylinders lying adjacent to one another. For the sake of convenience the cylinders in the two rows are shown as parallel to one another but it will be readily appreciated that they may be inclined to one another as for example in an engine of the V-type. In this construction each cylinder F contains a sleeve valve $F^1$ within which a piston $C^1$ can reciprocate the outer end of the sleeve $F^1$ being closed by a plug-like cylinder head G. As in the construction shown in Figure 1, the outer end $F^2$ of the sleeve valve carries a pin $F^3$ which engages the interior of a ball member $F^4$ mounted to rock in a disc H carried on one end of a rotatable shaft $H^1$ and constituting the driving member for the sleeve. The shaft $H^1$ is supported in bearings in a carrier $H^2$ which is detachably connected to a bracket $F^5$ formed integral with or rigidly connected to the cylinder F.

The disc H has a flange-like edge constituting a bevel wheel $H^3$ which is engaged by a further bevel wheel $J^1$ on a layshaft J, the arrangement being such in the case of an engine having two rows of cylinders adjacent to one another as shown in Figure 2, that the shafts $H^1$ for the sleeve valves of a number of cylinders can be driven by bevel wheels $J^1$ on the same layshaft, a single bevel wheel being employed to operate the shafts $H^1$ for each pair of adjacent cylinders.

It is to be understood however that although Figures 2 and 3 show an arrangement as applied to an engine having two adjacent rows of cylinders, a similar construction may be applied to an engine having only a single cylinder row. Further when applied to an engine having several cylinder rows, a separate layshaft such as J may be provided for driving the shafts $H^1$ of each cylinder row.

In the construction shown in Figures 2 and 3, it will be seen that after the plug-like cylinder head has been detached and removed from the cylinder, the support for the shaft $H^1$ can then be detached from the bracket, whereupon the shaft $H^1$ can be moved away from the cylinder so as to disengage the ball and socket joint from the pin. The sleeve can then be withdrawn from the outer open end of the cylinder without disturbing the connection between the cylinder and the crankcase indicated at $G^2$.

In the construction shown in Figure 4, each cylinder K is provided with a plug-like cylinder head (not shown) as above described, contains a sleeve valve L within which a piston P can reciprocate and provided with a radial boss-like part $L^1$ in which is mounted to rock a ball member $L^2$ having a cylindrical bore which is engaged by a pin $L^3$ eccentrically mounted on a rotary disc-like part M constituting a sleeve driving member. The disc-like part M has a flange-like rim $M^1$ the inner surface of which constitutes a bearing surface and engages a bearing member N which is detachably connected to the cylinder block K, this bearing member being of annular trough-like form and having connected to its outer edge a thrust member $N^1$ which bears on a flange $M^2$ on the disc-like part M so as to prevent this part moving axially relatively to its bearing member N. The outer surface of the flange $M^1$ is formed as a toothed pinion $M^3$ which is engaged by a second pinion O on a layshaft $O^1$, the pinion extending through a slot $N^2$ formed partly in the annular bearing member N and partly in the thrust member $N^1$.

The arrangement is such that after the cylinder head has been removed, the bearing member N and the thrust member $N^1$ can be detached bodily from the cylinder block, whereupon the sleeve valve can be withdrawn from the outer end of the cylinder together with the members N and M without disturbing the connection between the cylinder and the crankcase indicated at $P^1$.

What I claim as my invention and desire to secure by Letters Patent is:—

1. A reciprocating fluid pressure engine including in combination a cylinder having inlet and outlet ports therein, a crank case on which the cylinder is mounted, a sleeve valve disposed within the cylinder and controlling the ports, a piston which can reciprocate within the sleeve valve, a detachable cylinder head, operating mechanism for the sleeve valve including a driving member connected to a part of the sleeve valve lying outside the crank case and adapted to impart to the sleeve a combined oscillating and reciprocating movement, and means whereby the sleeve can be disconnected from its operating mechanism without access to the interior of the crank case so as to permit the sleeve to be withdrawn through the end of the cylinder remote from the crank case.

2. A reciprocating fluid pressure engine including in combination a cylinder having inlet and outlet ports therein and an additional opening extending through its wall, a crank case on which the cylinder is mounted, a sleeve valve disposed within the cylinder and controlling the ports, a piston which can reciprocate within the sleeve valve, a detachable cylinder head, operating mechanism for the sleeve valve including a driving member passing through the said additional opening and adapted to impart to the sleeve a combined oscillating and reciprocating movement, and means whereby the sleeve can be disconnected from its operating mechanism without access to the interior of the crank case so as to permit the sleeve to be withdrawn through the end of the cylinder remote from the crank case after the cylinder head has been removed.

3. A reciprocating fluid pressure engine including in combination a cylinder having inlet and outlet ports therein, a crank case on which the cylinder is mounted, a sleeve valve disposed within the cylinder and controlling the ports, a piston which can reciprocate within the sleeve valve, a detachable cylinder head, operating mechanism for the sleeve valve comprising a shaft disposed outside the crank case and rotating about an axis at right angles to the cylinder axis, flexible coupling means between this shaft and the sleeve whereby rotation of the shaft imparts a combined oscillating and reciprocating motion to the sleeve, supporting means for the shaft such that this shaft can be moved axially to cause disengagement of the flexible coupling means without access to the interior of the crank case so as to permit the sleeve to be withdrawn through the end of the cylinder remote from the crank case after the cylinder head has been removed.

4. A reciprocating fluid pressure engine including in combination a cylinder having inlet and outlet ports therein and a slot extending from the outer end of the cylinder to a point intermediate in its length, a crank case on which the cylinder is mounted, a sleeve valve disposed within the cylinder and controlling the ports, a piston which can reciprocate within the sleeve valve, a detachable cylinder head, operating mechanism for the sleeve valve including a driving member passing through the slot in the cylinder and adapted to impart to the sleeve a combined oscillating and reciprocating movement, and means whereby the driving member can be disconnected from the remainder of the sleeve-operating mechanism without access to the interior of the crank case, whereupon after removing the cylinder head the sleeve can be withdrawn through the end of the cylinder remote from the crank case, the slot forming a passage-way for the driving member during this withdrawal.

5. A reciprocating fluid pressure engine including in combination a cylinder having inlet and outlet ports therein and a slot extending from the outer end of the cylinder to a point intermediate in its length, a crank case on which the cylinder is mounted, a sleeve valve disposed within the cylinder and controlling the ports, a piston which can reciprocate within the sleeve valve, a detachable cylinder head, operating mechanism for the sleeve valve comprising a shaft disposed outside the crank case and rotating about an axis at right angles to the cylinder axis, a driving member secured to the sleeve and extending through the slot in the cylinder, flexible coupling means connecting the driving member to the said shaft so that rotation of the shaft imparts to the sleeve a combined oscillating and reciprocating movement, means whereby the remainder of the operating mechanism can be disconnected from the driving member whereupon after removing the cylinder head the sleeve can be withdrawn through the end of the cylinder remote from the crank case, the slot forming a passage-way through which the driving member can slide during this withdrawal.

6. A reciprocating fluid pressure engine including in combination a crank case, a cylinder mounted on the crank case and having inlet and outlet ports therein and a slot extending from the end of the cylinder remote from the crank case to a point intermediate in the length of the cylinder, a sleeve valve disposed within the cylinder and controlling the ports, a piston which can reciprocate within the sleeve valve, a detachable plug-like cylinder head extending within the end of the sleeve valve remote from the crank case to a point beyond the inner end of the slot in the cylinder, operating mechanism for the sleeve valve including a driving member passing through the slot in the cylinder and adapted to impart to the sleeve a combined oscillating and reciprocating movement, and means whereby the driving member can be disconnected from the remainder of the sleeve operating mechanism without access to the interior of the crank case, whereupon after removing the cylinder head the sleeve valve can be withdrawn through the end of the cylinder remote from the crank case, the slot forming a passage-way for the driving member during this withdrawal.

7. A reciprocating fluid pressure engine including in combination a crank case, a cylinder mounted on the crank case and having inlet and outlet ports therein and a slot extending from the end of the cylinder remote from the crank case to a point intermediate in the length of the cylinder, a sleeve valve disposed within the cylinder and controlling the ports, a piston which can reciprocate within the sleeve valve, a detachable plug-like cylinder head which extends within the end of the sleeve valve remote from the crank case to a point beyond the inner end of the slot in the cylinder, operating mechanism for the sleeve valve comprising a shaft disposed outside the crank case and rotating about an axis at right angles to the cylinder axis, a driving member secured to the sleeve and extending through the slot in the cylinder, flexible coupling means connecting the driving member to the said shaft so that rotation of the shaft imparts to the sleeve a combined oscillating and reciprocating movement, and means whereby the remainder of the operating mechanism can be disconnected from the driving member whereupon after removal of the cylinder head the sleeve can be withdrawn through the end of the cylinder remote from the crank case, the slot forming a passage-way through which the driving member can slide during this withdrawal.

8. A reciprocating fluid pressure engine including in combination a cylinder having inlet and outlet ports therein and an additional opening extending through its wall, a crank case on which the cylinder is mounted, a sleeve valve disposed within the cylinder and controlling the ports, a piston which can reciprocate within the sleeve valve, a detachable cylinder head, a driving member for the sleeve rigidly connected thereto and extending through the said additional opening, operating mechanism connected to the driving member and adapted to impart to the sleeve a combined oscillating and reciprocating movement, and means whereby the operating mechanism can be disconnected from the driving member without access to the interior of the crank case, whereupon after removing the cylinder head the sleeve can be withdrawn through the end of the cylinder remote from the crank case.

9. A reciprocating fluid pressure engine including in combination a cylinder having inlet and outlet ports therein, a crank case on which the cylinder is mounted, a sleeve valve disposed within the cylinder and controlling the ports, a piston which can reciprocate within the sleeve valve, a detachable cylinder head, operating mechanism for the sleeve valve comprising a driving member rigidly connected to the sleeve at a point outside the crank case, a shaft rotating about an axis at right angles to the cylinder axis, flexible coupling means between this shaft and the driving member on the sleeve, whereby rotation of the shaft imparts a combined oscillating and reciprocating motion to the sleeve, and supporting means for the shaft such that this shaft can be moved axially to cause disengagement of the flexible coupling means without access to the interior of the crank case so as to permit the sleeve to be withdrawn through the end of the cylinder remote from the crank case.

10. A reciprocating fluid pressure engine including in combination a crank case, a cylinder mounted on the crank case and having inlet and outlet ports therein and a slot extending from the end of the cylinder remote from the crank case to a point intermediate in the length of the cylinder, a sleeve valve disposed within the cylinder and controlling the ports, a piston which can reciprocate within the sleeve valve, a detachable plug-like cylinder head extending within the end of the sleeve remote from the crank case to a point beyond the inner end of the slot in the cylinder, operating mechanism for the sleeve comprising a driving member rigidly connected to the sleeve and extending through the slot, a shaft rotating about an axis at right angles to the cylinder axis, flexible coupling means connecting the shaft to the driving member whereby rotation of the shaft imparts to the sleeve a combined oscillating and reciprocating movement, a second shaft imparting rotation to the first shaft and means whereby the first shaft can be moved axially so as to disconnect the flexible coupling means from the driving member whereupon after the cylinder head has been removed the sleeve can be withdrawn through the end of the cylinder remote from the crank case, the slot forming a passage-way through which the driving member can slide during this withdrawal.

11. A reciprocating fluid pressure engine including in combination a crank case, two rows of cylinders mounted on the crank case and each having inlet and exhaust ports therein and a slot extending through the end of each cylinder remote from the crank case to a point intermediate in the length of the cylinder, a sleeve valve disposed within each cylinder and controlling the ports, a piston which can reciprocate within the sleeve valve, a detachable plug-like cylinder head in each cylinder extending within the sleeve to a point beyond the inner end of the slot in the cylinder, operating mechanism for each sleeve comprising a driving member rigidly connected to the sleeve and extending through the slot, a driving shaft disposed with its axis at right angles to that of the cylinder, a flexible coupling connecting the driving shaft to the driving member whereby rotation of the driving shaft imparts a combined oscillating and reciprocating motion to the sleeve, and a detachable mounting for each driving shaft permitting the driving shaft to be disconnected from the driving member, a gear wheel on each driving shaft and a main shaft carrying gear wheels each of which meshes with the gear wheels of two of the driving shafts as set forth.

In testimony whereof I have signed my name to this specification.

GEORGE SHAKESPEARE WILKINSON.